May 28, 1929.  A. R. GROSS  1,714,867
WELDING APPARATUS
Filed July 2, 1927   6 Sheets-Sheet 1
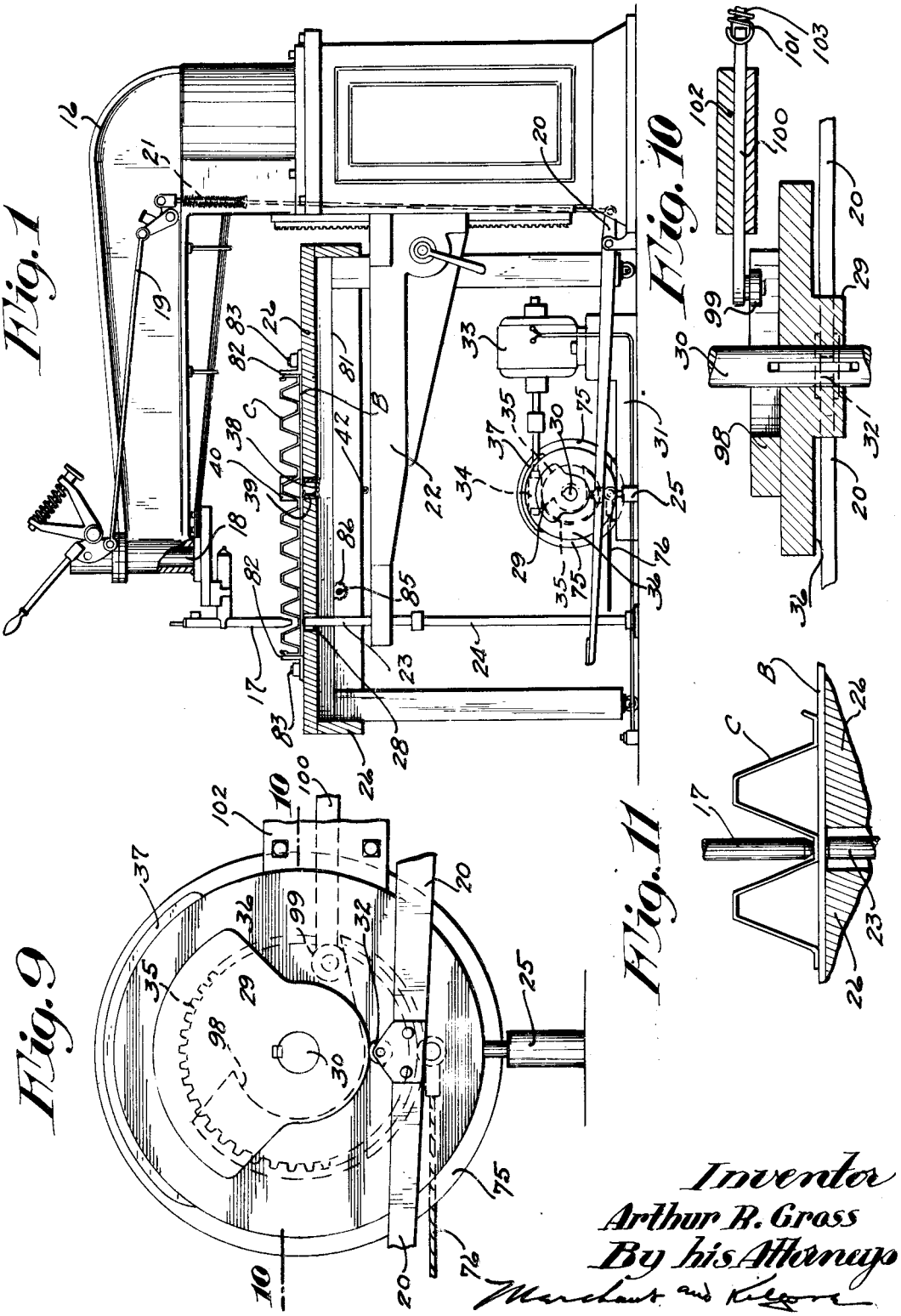
Inventor
Arthur R. Gross
By his Attorneys
Merchant and Kilgore

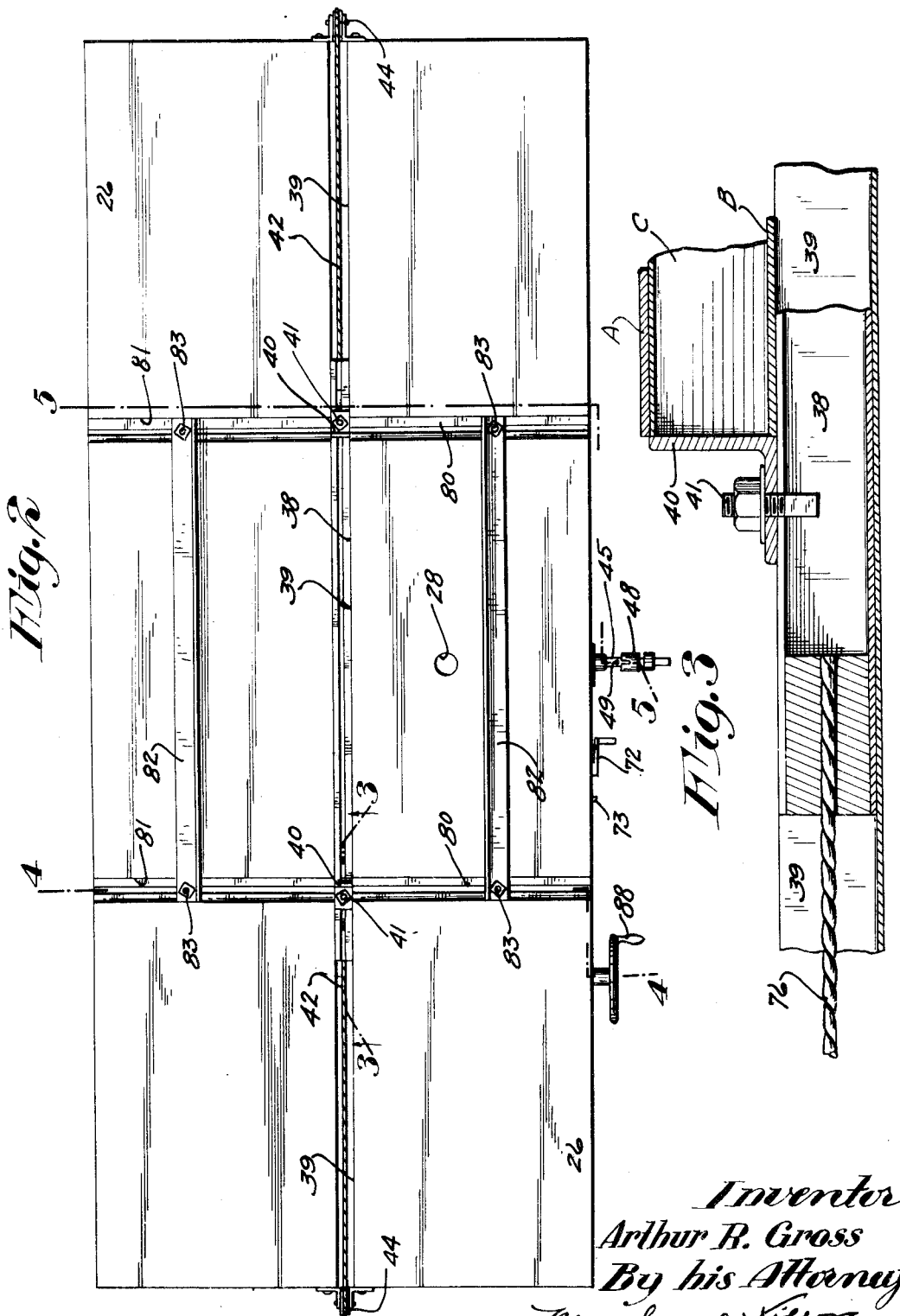

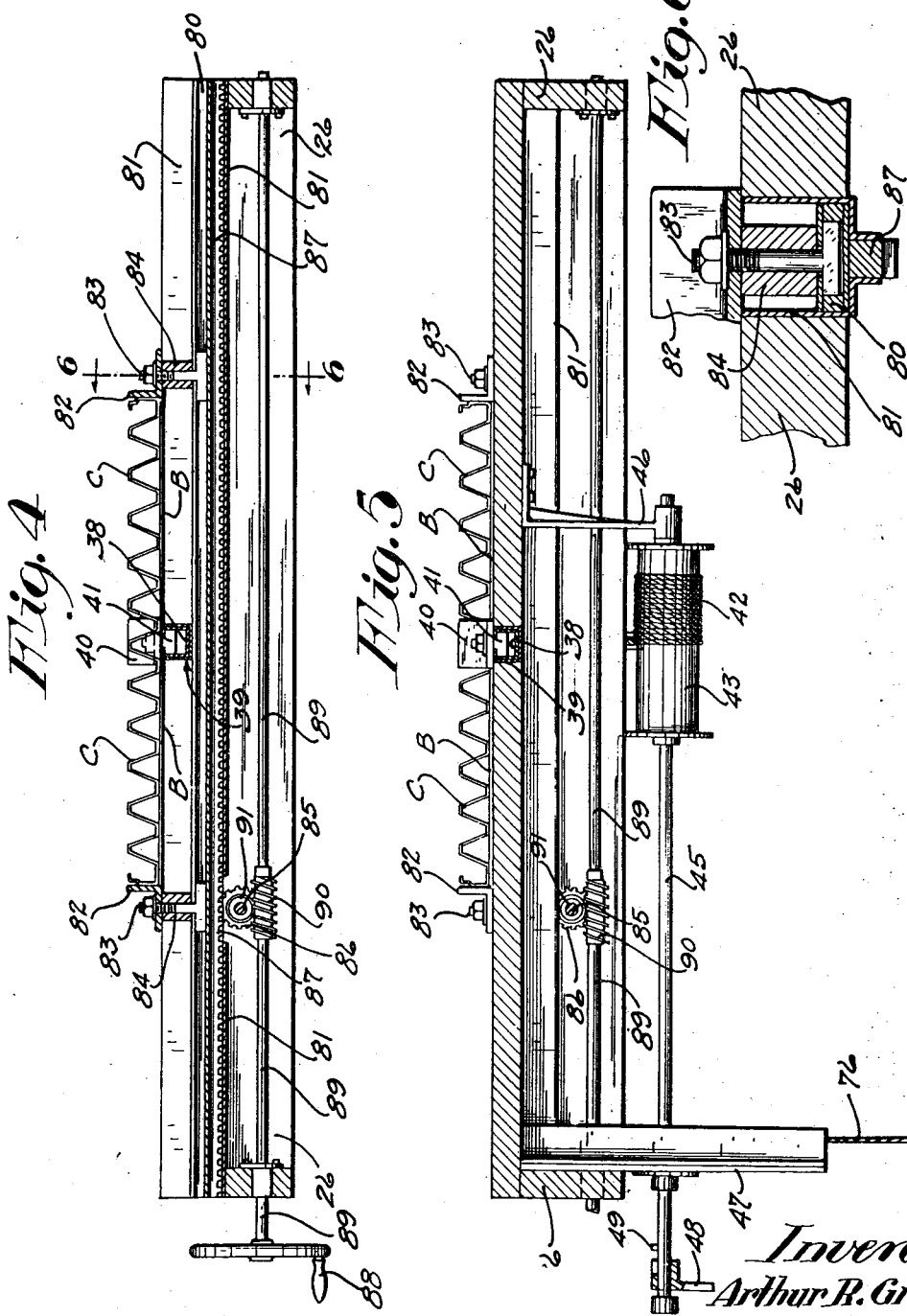

Inventor
Arthur R. Gross
By his Attorneys
Merchant & Kilgore

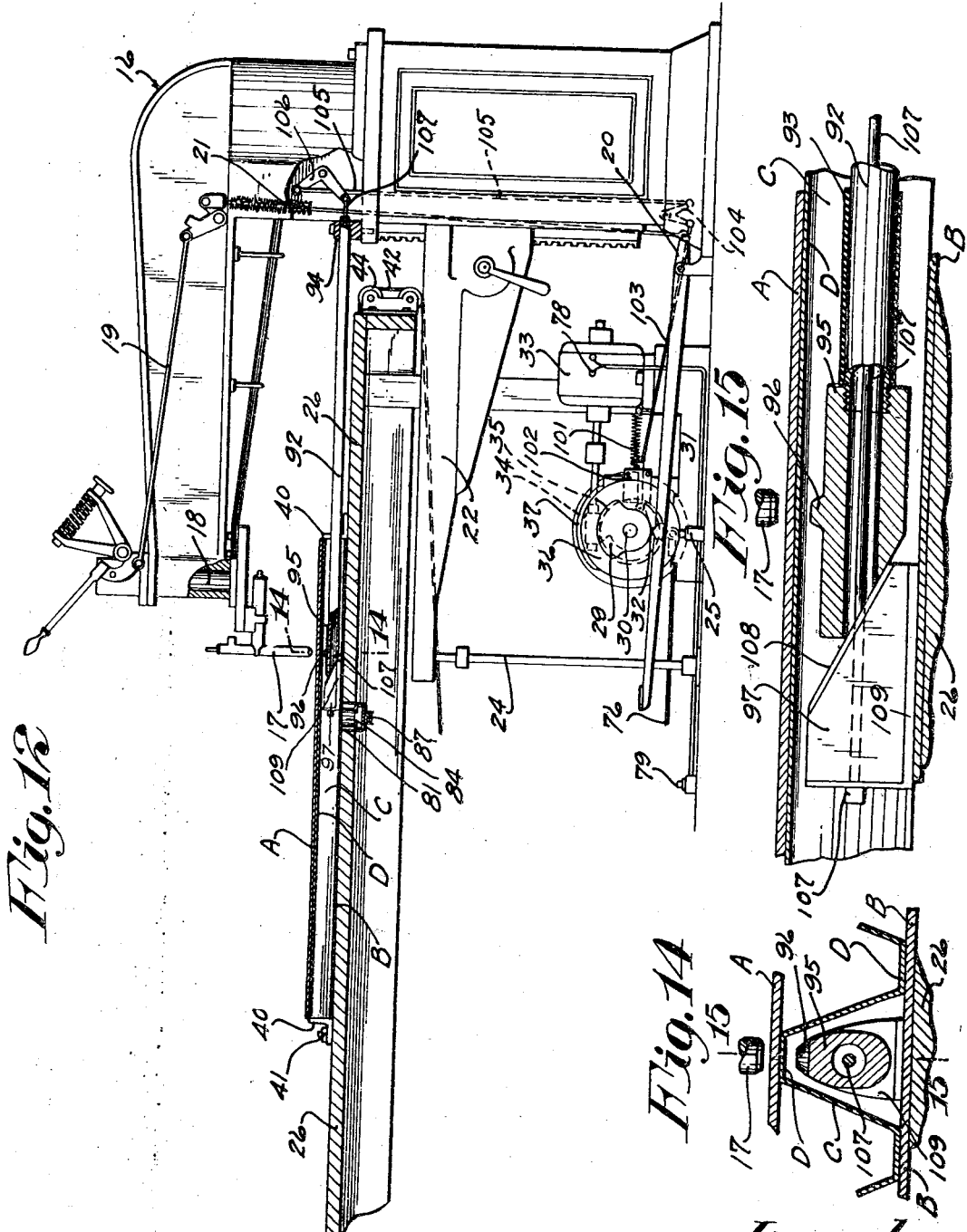

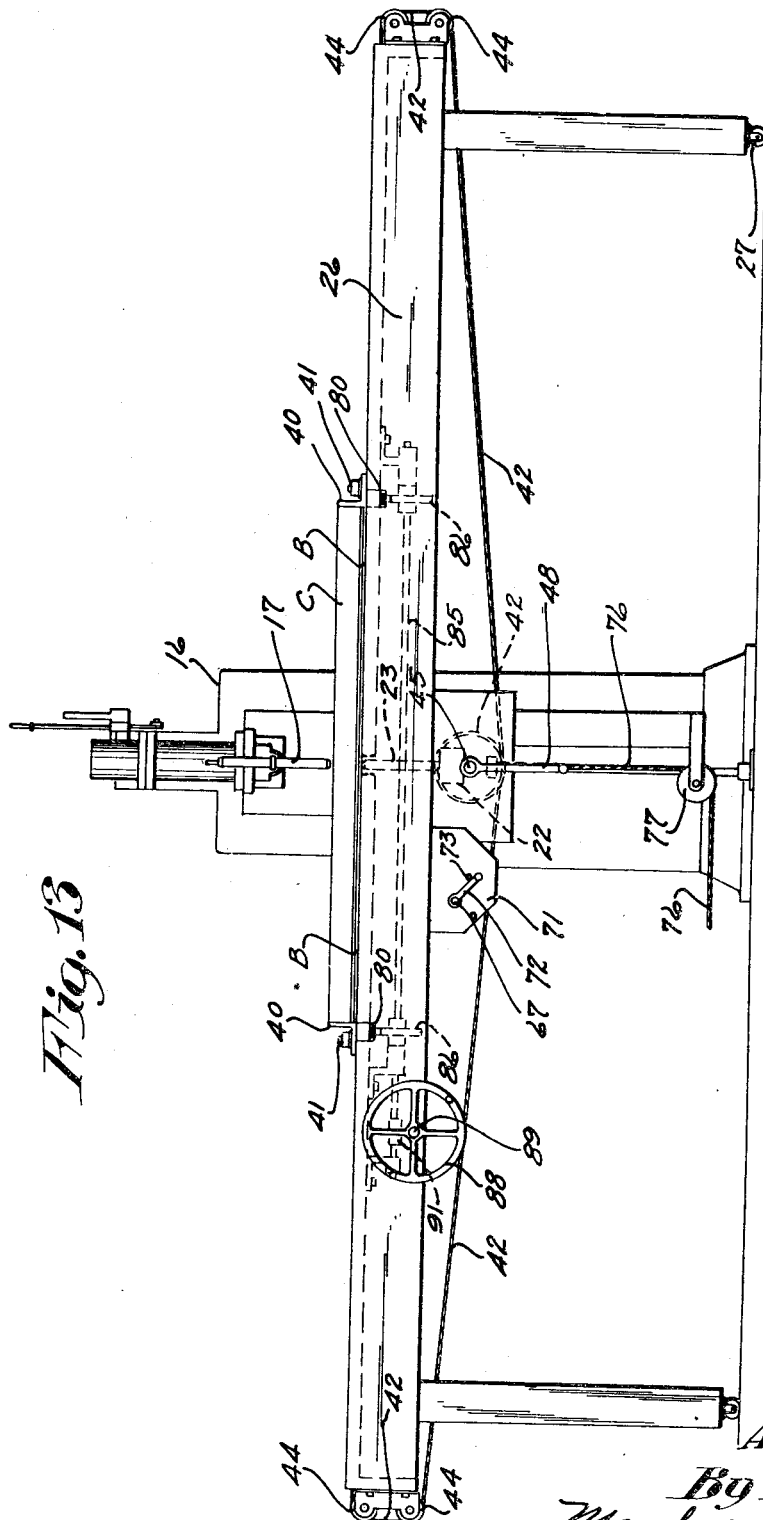

Patented May 28, 1929.

1,714,867

UNITED STATES PATENT OFFICE.

ARTHUR R. GROSS, OF ST. PAUL, MINNESOTA, ASSIGNOR TO GROSS METAL PRODUCTS COMPANY, OF ST. PAUL, MINNESOTA, A CORPORATION OF MINNESOTA.

WELDING APPARATUS.

Application filed July 2, 1927. Serial No. 203,236.

My present invention has for its object to provide an improved welding apparatus intended for general use, but especially adapted for use in the construction of sheet metal shells and more particularly to internally trussed sheet metal doors, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a view partly in side elevation and partly in transverse vertical section showing a spot welder and work support table having the invention embodied therein and adjusted for external welding;

Fig. 2 is a plan view of the table;

Fig. 3 is a fragmentary detail view with some parts sectioned on the line 3—3 of Fig. 2, on an enlarged scale;

Fig. 4 is a transverse vertical section taken on the irregular line 4—4 of Fig. 2, on an enlarged scale;

Fig. 5 is a transverse vertical section taken on the irregular line 5—5 of Fig. 2, on an enlarged scale;

Fig. 6 is a fragmentary detail view principally in section taken on the line 6—6 of Fig. 4, on an enlarged scale;

Fig. 9 is a side elevation of the automatic control mechanism and switch;

Fig. 10 is a detail view with some parts sectioned on the line 10—10 of Fig. 9;

Fig. 11 is an enlarged fragmentary detail view showing the electrodes in position for spot welding;

Fig. 12 is a view corresponding to Fig. 1 with the exception that the spot welder and table are adjusted for internal welding;

Fig. 13 is a front elevation of the parts shown in Fig. 12;

Fig. 14 is a detail view principally in section taken on the line 14—14 of Fig. 12, on an enlarged scale; and Fig. 15 is a fragmentary detail view partly in elevation and partly in longitudinal vertical section taken on the line 15—15 of Fig. 14.

Figure 8:
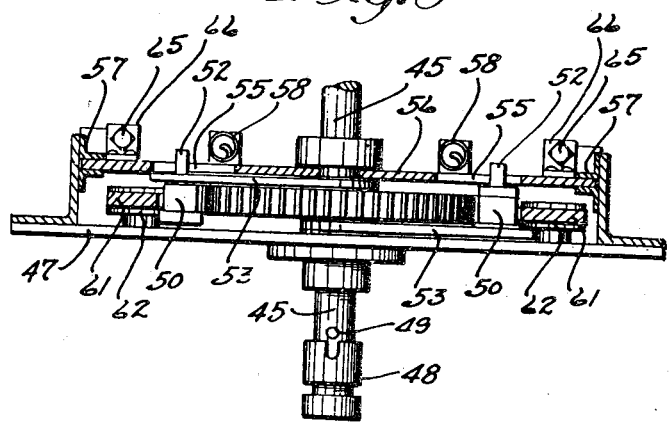
Fig. 8 is a view partly in horizontal section taken approximately on the line 8—8 of Fig. 7.
Figure 7:
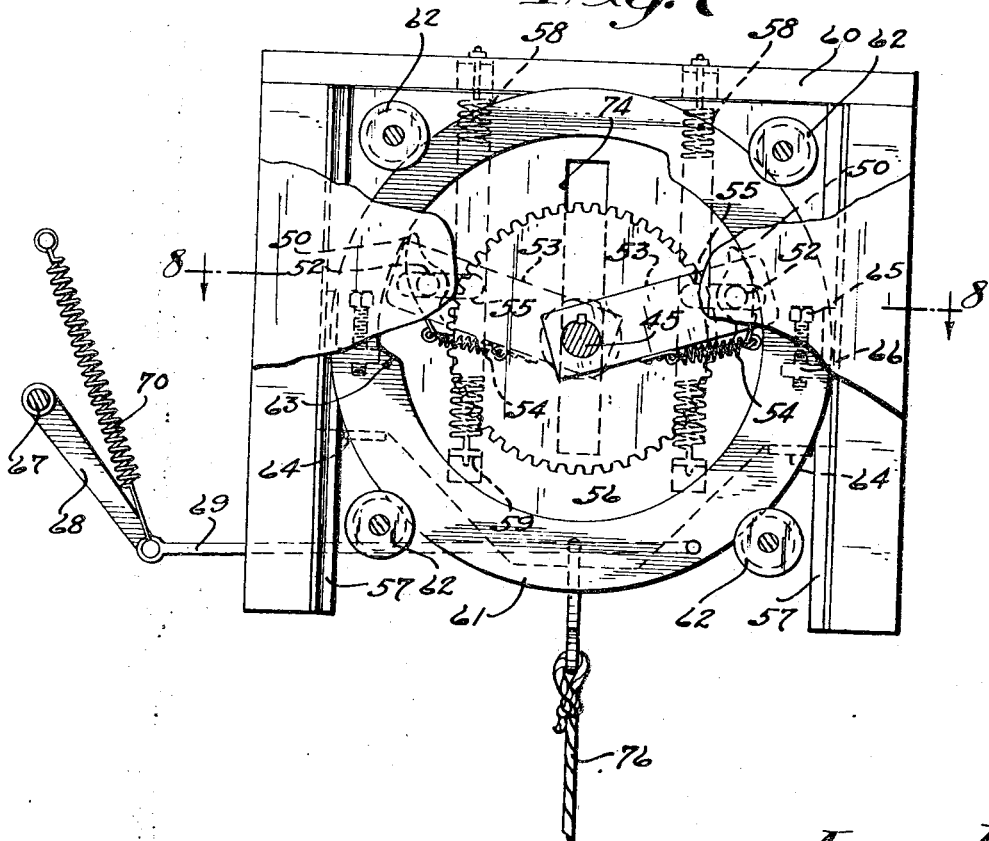
Fig. 7 is a front elevation with some parts broken away and other parts sectioned showing the intermittent feed mechanism for the main traveller on the table.

Referring now in detail to the drawings, there is illustrated a door of the type heretofore referred to which includes a front plate A, a back plate B, and a truss structure C for said plates comprising a corrugated metal sheet, preferably of a lighter gauge than said plates. This corrugated plate C has flat apexes D which directly engage the inner faces of the plates A and B.

In assembling the door, the truss structure C is first welded to the back plate B and thereafter said structure is welded to the front plate A.

In making the above described door or other sheet metal shell, I preferably use a standard welding machine 16 in which the present invention is embodied. This welding machine 16 is more or less diagrammatically illustrated for the reason that the details and operation thereof are well known to those familiar with such machines. However, it is essential to note the following parts of the welding machine, to wit: the upper electrode or welding point 17, vertically adjustable holder 18, for said electrode, operating connections for the holder 18 indicated as an entirety by the numeral 19, with the exception of the foot lever 20, spring 21, which normally yieldingly holds said connections with the electrode 17 and foot lever 20 raised, drop arm 22 in which a lower electrode or welding point 23 is removably mounted and axially aligned with the welding point 17 for co-operation therewith, and an adjustable support 24 for said drop arm 22.

The electric circuit for the electrodes 17 and 23 is not shown except for the normally open control switch 25 mounted on the floor directly under the foot lever 20.

The door, while being assembled and spot welded, is supported on a large work table 26 mounted on casters 27 so that the position thereof may be changed, at will, in respect to the welding machine 16. When welding the truss structure C to the back plate B, the table 26 is placed transversely of the welding machine 16 within the throat thereof and with the lower electrode 23 extending through an aperture 28 in the top of said table (see Fig. 1).

It will be noted that the back plate B rests directly on the top of the table 26 and that the truss structure C rests on said plate with its corrugations extending transversely of the welding machine 16, and which corrugations extend lengthwise of the door. It will also be noted that the upper end of the electrode 23 is flush with the upper surface of the top of the table 26 and engages the outer face of the back plate B and that the electrode 17 extends into the corrugation in the truss structure C overlying the electrode 23.

For automatically and successively operating the foot lever 20 to project the upper electrode 17 and thereby move the same into contact with the underlying flat apex D and clamp the bottom plate B and said apex together while they are being spot welded, there is provided a cam 29 mounted on a horizontal shaft 30 which extends transversely over the foot lever 20 and is journaled on a base 31. This cam 29 is arranged to engage an antifriction roller 32 on the foot lever 20, once during each rotation of the shaft 30, and hold said lever depressed against the action of the spring 21 a predetermined period of time.

The shaft 30 is driven by an electric motor 33 mounted on the base 31 and having a worm 34 on its armature shaft which meshes with a worm gear 35 on said shaft. Also keyed to the shaft 30 is a wheel 36 having a cam 37 on its periphery arranged to engage the control switch 25 and close the same, once during each rotation of said shaft. It is important to note that the length of the cam 37 is such that the switch 25 is not closed until the foot lever 20 has been depressed by the cam 29 to move the electrode 17 into contact with the truss structure C and that said switch is released by said cam before the foot lever 20 is released by the cam 29. It will thus be seen that the spot welding is completed while the back plate B and truss structure C are held clamped together by the electrodes 17 and 23 to prevent arcing.

To cause the electrodes 17 and 23 to form spot welds in the door in a row in a given direction and with the weldings spaced predetermined distances apart, a step by step movement is imparted to the door in the direction of the corrugation in the truss structure C, there is provided a main feed mechanism which includes a traveller 38 automatically operated from the shaft 30, as will presently appear. This traveller 38 is in the form of a channel having inturned side flanges and is mounted in a way 39 set in the top of the table 26 longitudinally and at the transverse center thereof and supports said traveller with its top flush with the upper face of said table top.

For causing the door to move on the table top 26 with the traveller 38, there is provided a pair of short rails 40 in the form of angle plates attached by T-bolts 41 to the traveller 38 and arranged to engage the upper and lower edges of the door and hold the same against endwise movement. While the T-bolts 41 securely clamp the rails 40 to the traveller 38, this clamping action does not interfere with the free sliding movement of the traveller 38 in the way 39. The door is held between the rails 40 with just enough clearance to permit said door to be moved transversely between said rails 40 by a secondary work feed mechanism, as will presently appear.

The main feed mechanism further includes a cable 42, the intermediate portion of which is wrapped about a windlass drum 43 which extends transversely under the table 26, and its ends are extended therefrom in reverse directions over guide sheaves 44, on the ends of said table, through the way 39 and attached one to each end of the traveller 38. The drum 43 has a shaft 45 journaled in a rear bearing 46 on the under side of the table 26 and a depending bearing plate 47 on said table at the front thereof. Applied to the outer projecting end of the shaft 45 is a hand crank 48 normally loose thereon but adapted to be connected thereto by a clutch 49, whereby the windlass drum 43 may be manually turned to move the traveller 38 and hence the door longitudinally on the table top and position the same in respect to the electrodes 17 and 23.

For imparting a step by step rotary movement to the driven shaft 45 from the driven shaft 30, there is provided a pair of reversely-acting dogs 50 arranged for action on a toothed wheel 51. Said toothed wheel 51 is keyed to the shaft 45 just back of the bearing plate 47, and the dogs 50 are attached by pivot studs 52 to a pair of radial swinging arms 53 pivoted to the shaft 45 on opposite sides of said wheel and support said dogs for circumferential swinging movement around the toothed wheel 51. Springs 54, attached to the dogs 50 and anchored to the arms 53, yieldingly hold said dogs for action on the toothed wheel 51. For causing the dogs 50 to produce a feeding action on the wheel 51, their pivot studs 52 are extended into apertures 55 in the form of horizontal slots in a vertically movable slide 56 mounted in ways 57 on the back of the bearing plate 47.

Obviously, the slots 55 not only connect the pivot studs 52 to the slide 56 but permit said studs to slide therein during the swinging movement of the arms 53. The slide 56 is moved in one direction and yieldingly held raised by a pair of coiled springs 58, the lower ends of which are attached at 59 to said slide and the upper ends of which are anchored to a horizontal bar 60 supported from the upper ends of the ways 57. Normally, one of the dogs 50 is held inactive by a dog release 61 in the form of a ring supported on a plurality of circumferentially spaced flanged wheels 62 loosely journaled on the bearing plate 47 to turn about the axis of the shaft 45.

For each dog 50, the dog release 61 is provided with an internal tripping abutment 63 arranged to be engaged by the active dog 50 during its movement by the slide 56 to rotate the toothed wheel 51 and release said dog after imparting to the wheel 51 a predetermined step of rotary movement. The step of movement imparted to the wheel 51 by the active dog 50 may be varied, at will, by limiting the lifting movement of the slide 56 by the springs 58 and position the active dog 50 different distances from its tripping abutment 63.

As one means of limiting the lifting movement of the slide 56, the same is provided with a pair of laterally projecting lugs 64 arranged to engage long set screws 65 having threaded engagement with lugs 66 on the ways 57. To turn the dog release 61 and thereby render one of the dogs 50 inactive and position the respective tripping abutment 63 in operative relation to the active dog 50, there is journaled on the under side of the table 26 a shaft 67 having a crank arm 68 connected by a link 69 to said dog release. A coiled spring 70, anchored to the table 26 and attached to the crank arm 68 at its free end, is arranged to move with said arm from one side of a dead center to the other and thereby yieldingly hold the dog release 61 where set.

The shaft 67 is journaled in front and rear bearings on the wheel 36, only the former of which is shown, and is in the form of a depending plate 71. A hand crank 72 is applied to the outer end of the shaft 67 for operating the same. To limit the swinging movement of the hand crank 72 and thereby position the respective tripping abutment 63 in respect to the active dog 50, there is provided a pair of stop pins 73 on the bearing plate 71. Obviously, the spring 70, acting on the crank arm 68, holds the hand crank 72 in engagement with one of the pins 73 depending on how the dog release 61 is set. A slot 74 is formed in the slide 56 through which the shaft 45 projects to permit free movement of said slide.

As previously stated, the springs 58 operate the slide 56 in one direction and to operate the same in a reverse direction against the tension of said springs, there is keyed to the shaft 30 a crank-acting disc 75 eccentrically connected by a cable 76 to said slide and arranged to operate the same once for each rotation of the shaft 30. The cable 76, between the slide 56 and disc 75, runs over guide sheaves 77, only one of which is shown.

The electric feed wires for the motor 33 are indicated by the numeral 78 and in one thereof is interposed a normally open foot controlled switch 79 mounted on the floor adjacent to the foot lever 20 where the same may be easily operated by the operator's foot to start the motor 33, and when released, said switch will automatically break the circuit to said motor.

A manually-operated secondary feed mechanism is provided for moving the door on the table 26 transversely thereof in respect to the electrodes 17 and 23 for positioning said door for parallel rows of spot welding between the corrugations in the truss structure C. This secondary feed mechanism includes a pair of travellers 80 that are channel-shaped in cross section, have inturned side flanges, and are slidably supported in correspondingly formed ways 81 set into the top of the table 26 transversely of the way 39. The door is held for movement with the traveller 80 by a pair of rails 82 in the form of angle bars connected by T-bolts 83 to said traveller. There is sufficient clearance between the door and rails 82 to permit free movement of the door therebetween by the main feed mechanism. The rails 82 also hold the door for straight-line movement under the action of the main feed mechanism. Spacing washers 84 on the T-bolts 83 hold the rails 82 with sufficient clearance to move freely over the top of the table 26. The travellers 80 are simultaneously operated by a shaft 85 having a pair of gears 86 that mesh with racks 87 on the bottoms of said travellers. The shaft 85 is manually-operated by a hand-piece-equipped wheel 88 on a shaft 89 having a worm 90 that meshes with a worm gear 91 on the shaft 85.

The operation of the welding apparatus thus far referred to may be briefly described as follows:

The back plate B is first placed on the table 26 lengthwise between the rails 40 and crosswise between the rails 82, and the truss structure C is placed on top of said plate. The rails 40 are then adjusted to the ends of the door and the rails 82 adjusted to the longitudinal edges thereof and secured by the respective T-bolts 41 and 83, with just sufficient clearance so that the door may be moved therebetween. The traveller 38 is then adjusted by the hand crank 48 to bring one end of the door at the electrodes 17 and 23 so that the first step of movement imparted to the door by the main feed mechanism will properly position the door in respect to said electrodes for the first spot welding. The travellers 80 are next adjusted by the hand wheel 88 to bring the corrugation at one longitudinal edge of the door in alignment with the electrodes 17 and 23 to position the door for the first row of spot welding. It may be here stated that the upper electrode 17 may be manually operated at any time either by the hand lever in the connections 19 or the foot lever 20.

With the door thus positioned, the operator steps on the switch 79 to start the motor 33 which drives the shaft 30 in the direction of the arrow marked on Fig. 9. Under the rotation of the shaft 30 its crank-acting disc 75, through the cable connection 76, draws the slide 56 downward against the action of the springs 58. This movement of the slide 56 which carries the dogs 50 therewith, causes the active dog 50 to rotate the toothed wheel 51 and impart a step of rotary movement to the shaft 45 to operate the drum 43, and causes the main feed mechanism, including the traveller 38, to impart a step of movement lengthwise to the door on the table 26 to position the same for the first spot welding to connect the truss structure C to the back plate B. During this movement of the slide 56, the active dog 50 engages the respective tripping abutment 63 and is moved thereby out of engagement with the toothed wheel 51 which stops further rotation of the shaft 45. Under further rotation of the shaft 30 and after the door has been positioned as just described, the cam 29 engages the anti-friction roller 32 on the foot lever 20, and depresses said lever which lowers the electrode 17 through the connections 19 heretofore described into engagement with the respective flat apex D of the truss structure C and clamp said apex onto the back plate B between the electrodes 17 and 23. Upon further rotation of the shaft 30, the cam 37 closes the switch 25 in the circuit for the electrodes 17 and 23 to produce a spot welding and then releases the electrode 17 before the cam 29 releases the foot lever 20 and allows the spring 21 to operate the connections 19 and lift the electrode 17.

During the latter half rotation of the shaft 30, slack is produced in the cable 76 by the crank-acting disc 75, thus allowing the springs 58 to lift the slide 56 and reset the active dog 50. A complete rotation of the shaft 45 represents one cycle in the operation of the welding mechanism which includes, in timed relation, a step of movement imparted to the door to position the same in respect to the back electrodes 17 and 23, the clamping of the back plate B and truss structure C together by the movement of the upper electrode 17 in respect to the lower electrode 23, to close the switch 25 to complete the circuit for the electrodes 17 and 23, and the opening of said switch before the clamping action of the back plate B and truss structure C is released to prevent arcing. This cycle produced by the welding mechanism is automatically and successively repeated in timed relation as long as the operator keeps the switch 79 closed and thus produces a row of spot welding the full length of the door, predetermined distances apart. At the completion of one row of welding, the operator releases the switch 79 and operates the hand wheel 88 to transversely move the door, as previously described, to position the same for the next row of welding in the adjacent flat apex D. He also moves the hand lever 72 to its other extreme position to turn the dog-release 61 and thereby render the active dog 50 inactive and the inactive dog 50 active, so that the shaft 45 will be operated in a reverse direction and also the door, so that the next row of spot welding will be formed in a reverse direction from that just described. This action is repeated until the truss structure C is welded to the back plate B at each of its lower flat apexes D.

At the completion of the spot welding of the truss structure C to the back plate B, the front plate A is positioned on said structure with the plates A and B interlocked at their longitudinal edges preferably as described in application, S. N. 161,630, heretofore referred to.

To weld the truss structure C to the front plate A requires internal welding and clamping means that can be inserted into a hollow structure, which in the present instance is between the corrugations in said truss structure, and said clamping means operated from a distant point. To adapt the welding apparatus for this type of work, a long horizontal welding arm or adapter 92 is substituted for the electrode 23. This welding arm 92 is adapted to be inserted longitudinally into any one of the corrugations in the truss structure C from either end of the door. Said welding arm 92 comprises a tubular rod of electrically conductive material such as copper or bronze, and has applied thereto an insulating jacket 93. The welding arm 92 extends longitudinally through the throat of the welder and has its inner end anchored at 94 to the frame of said welder and insulated therefrom. On the outer or free end of the outer arm 92 is a relatively heavy hollow head 95 of the same material as said arm and provided with an upstanding welding point or electrode 96 aligned with the electrode 17.

By reference to Figs. 14 and 15, it will be noted that the welding head 95 is of such size and shape that it may be raised or lowered in the corrugation in the truss structure C in which it extends, and the transverse shape thereof is such that it will freely move through said corrugation without very much lateral movement so that its electrode 96 will always align with the electrode 17.

To clamp the front plate A to the flat apex D on which it rests, the electrode 17 is brought into engagement with the outer face of said plate, as previously described, and there is provided a wedge block 97 for lifting the welding head 95 to bring its welding point 96 into contact with the inner face of said apex previous to the welding action. The wedge block 97 slidably rests on the back plate B, as a base of resistance, and is automatically operated from the shaft 30 to lift the welding head 95 and bring its electrode 96 into contact with the respective apex D in the same timed relation as that of the electrode 17 with the closing and opening of the switch 25. The welding arm 92 has sufficient flexibility to permit raising and lowering movements of its electrode 96 and the weight thereof is sufficient to cause the head 95 to follow the wedge block 97 as the same is moved from under said head and thereby carry the electrode 96 out of contact with the respective apex D.

The connections for automatically operating the wedge block 97 in timed relation with the opening and closing of the switch 25 and the movements of the electrode 17, as well as the door on the table 26 by the main feed mechanism, includes an internal cam 98 on the shaft 30. This cam 98 is adapted to engage a roller-equipped stud 99 on a bar 100 and draw the same forward, hold the same a predetermined period of time, and then release the same to be retracted by a coiled spring 101 anchored to the base of the motor 33. This bar 100 is slidably mounted in a bearing 102 on the base 31 and has attached to its rear end a lower horizontal operating rod 103, connected by a bell-crank 104 to a link 105, which, in turn, is connected by a bell-crank 106 to a rod 107, which extends longitudinally into the welding arm 92 and its head 95 and has the wedge block 97 attached to its outer projecting end. Normally, the spring 101 acting on the sliding bar 100 holds the connections 103 and 107, inclusive, with the wedge block 97 in its extreme position from the welding head 95. The wedge block 97 has a wearing shoe 108 with which the welding head 95 has beveled engagement and is further provided with a wearing shoe 109 that rests on the back plate B. The body of the wedge block 97 is of suitable material to insulate the shoe 108 from the shoe 109. The rod 107 is always out of engagement with the welding arm 92 and its head 95.

Suitable means, not shown, will be provided for cooling the welding head 95, such as the circulation of water in a tube through the welding arm 92 and said head 95.

The operation of the welding apparatus for the type of work just described may be briefly stated as follows:

Normally, the wedge block 97 is positioned to release the welding head 95 so that the door may be freely moved by the main feed mechanism. At the completion of the step of movement imparted to the door by the main feed mechanism, the cam 98 engages the roller-equipped stud 99, draws the bar 100 forward against the tension of the spring 101, and through the connections 103 to 107, inclusive, draws the wedge block 97 under the welding head 95 and thereby lifts the electrode 96 into contact with the overlying flat apex D. At this same time the upper electrode 17 is moved onto the front plate A, as previously described. The cam 98 continues to hold said connections to the wedge block 97 during the welding action and does not release said block until after the welding action is completed, to prevent arcing.

At the completion of one row of spot welding by the electrodes 17 and 96, the main feed mechanism is operated to move the door a sufficient distance to completely withdraw the electrode 96 and the wedge block 97 from the respective corrugation to permit the secondary feed mechanism to be operated to align the next corrugation with the welding arm 92.

In case the door being welded is of a length greater than that of the welding arm 92, the welding mechanism is operated to weld the front plate A to the truss structure C from one end of the door to the longitudinal center thereof, and then said door is turned end for end and the other half thereof welded in a similar manner.

What I claim is:

1. In a spot welder, a pair of co-operating electrodes, at least one of which is relatively movable, automatic means for successively causing the electrodes to spot weld a piece of work therebetween, automatic feed mechanism for positioning the spot welding on the work in a row and spaced predetermined distances apart, and offsetting mechanism for causing the electrodes to produce a plurality of rows of spot welding on the work.

2. In a spot welder, a pair of co-operating electrodes, at least one of which is relatively movable, a normally open control switch in the electric circuit for the electrodes, intermittent feed mechanism for changing the relative position of the electrodes and a piece of work to be spot welded thereby, and automatic mechanism for causing the electrodes to clamp a piece of work therebetween for closing said switch and then releasing the same during the period of time in which the work is clamped between the electrodes and for operating said feed mechanism in a cycle of timed relation and for continuously repeating said cycle of timed relation.

3. In a spot welder, a pair of co-operating electrodes, a work support table, primary work feed mechanism, automatic means for intermittently operating the primary feed mechanism in respect to the electrodes to impart a step by step movement to a piece of work longitudinally on the table, and secondary feed mechanism for moving said work transversely of the table in respect to the electrodes.

4. In a spot welder, a pair of co-operating electrodes, a work support table, a traveller mounted in a way on said table having means for holding a piece of work for movement therewith, means for operating the traveller including a shaft and connections from the shaft to the traveller, a toothed wheel attached to the shaft, a spring-retracted slide on the table, a pair of dogs mounted on the slide at diametrically opposite sides of the toothed wheel, yielding means under strain to cause the dogs to engage the toothed wheel, a releasing device for holding either one of the dogs inoperative, and automatic means for projecting the slide at predetermined intervals of time to cause the active dog to impart a step of movement to the toothed wheel, said device having a cam for releasing the active dog during the projecting movement of the slide.

5. The structure defined in claim 4 in which the dog-releasing device is adjustable to change the position of its cam and thereby vary the length of the step of movement imparted to the toothed wheel by the active dog.

6. The structure defined in claim 4 in further combination with a crank for moving the dog-releasing device from one extreme position to the other, and a spring movable with the crank from one side to the other of a dead center for holding the crank with the dog-releasing device in either of its extreme positions.

7. The structure defined in claim 4 in further combination with a secondary traveller mounted in a way on the table for movement transversely of the main traveller and having adjustable means for holding the work for movement therewith, and means for operating the secondary traveller.

8. In a spot welder, a pair of co-operating electrodes, at least one of which is relatively movable, a normally open control switch in the electric circuit for the electrodes, a lever for operating the movable electrode to clamp a piece of work between the electrodes, a driven member having a cam for actuating the lever to position the movable electrode on the work and then release the same, and a second cam on said member for closing said switch and then releasing the same during the period of time in which the lever is held by the first noted cam.

9. In a spot welder, a pair of relatively movable co-operating electrodes, a normally open control switch in the electric circuit for the electrodes, an operating lever for each electrode, a driven member having a pair of cams for operating said levers to clamp the electrodes onto a piece of work therebetween and then release the same, and another cam on said member for closing said switch and then releasing the same during the period of time in which the levers are held by the first noted pair of cams.

10. In a welder, co-operating inner and outer electrodes, means reacting against one part of the work and operative to move the inner electrode against another part of the work that is between the electrodes, and means for moving the outer electrode against the work.

11. In a welder, a pair of co-operating electrodes, a relatively long arm which carries one of the electrodes with freedom for movement toward and from the other electrode, means reacting against one part of the work and operative to move the electrode carried by the arm against another part of the work.

12. In a welder, co-operating inner and outer electrodes, a relatively long arm on which the inner electrode is carried for movement toward or from the outer electrode, a projector reacting against one part of the work and operative to move the inner electrode against another part of the work that is between the electrodes, and means for moving the outer electrode against the work.

13. In a welder, co-operating inner and outer electrodes, a relatively long arm on which the inner electrode is carried for movement therewith toward or from the outer electrode, and a projector reacting against one part of the work and operative to move the arm and position the inner electrode against another part of the work that is between the electrodes.

14. In a welder, co-operating inner and outer electrodes, a relatively long arm on which the inner electrode is carried for movement toward or from the outer electrode, and a projector reacting against one part of the work and operative to move the inner electrode against another part of the work that is between the electrodes and having operating connections extending along the arm.

15. In a welder, co-operating inner and outer electrodes, a relatively long arm on which the inner electrode is carried for movement toward or from the outer electrode, a projector reacting against one part of the work and operative to move the inner electrode against another part of the work that is between the electrodes and having operating connections extending along the arm, automatic feed mechanism for positioning the spot welding on the work in a row and spaced predetermined distances apart, and control mechanism for reversing the feed mechanism to alternately change the direction in which the row of spot welding is produced.

16. In a welder, a pair of co-operating electrodes, a relatively long arm which carries one of the electrodes with freedom for movement toward and from the other electrode, means reacting against one part of the work and operative to move the electrode carried by the arm against another part of the work, a work support table, work feed mechanism, and automatic means for intermittently operating the feed mechanism to impart a step by step movement to a piece of work on said table longitudinally of the arm.

17. In a welder, a work support table, upper and lower co-operating electrodes, a relatively long arm on which the lower electrode is carried, means reacting against a part of the work on the table and operative to move the lower electrode against another part of the work that is between the electrodes, and work feed mechanism for intermittently moving the work on the table in respect to the electrodes.

18. In a spot welder, a pair of co-operating electrodes, at least one of which is relatively movable, a normally open control switch in the electric circuit for the electrodes, connections for operating the movable electrode to clamp a piece of work between the electrodes, driving mechanism including a cam for actuating said connections to position the movable electrode on the work and then release the same, said mechanism also including a second cam for closing said switch and then releasing the same during the time in which the connections are being acted upon by the first noted cam.

In testimony whereof I affix my signature.

ARTHUR R. GROSS.